(12) United States Patent
Shah et al.

(10) Patent No.: US 11,316,620 B2
(45) Date of Patent: Apr. 26, 2022

(54) ENHANCED HARQ ALGORITHM FOR LARGE ROUND TRIP DELAY LINKS

(71) Applicants: Samir Shah, Ottawa (CA); Geoffrey McHardy, Carp (CA); Adrian Turcanu, Ottawa (CA)

(72) Inventors: Samir Shah, Ottawa (CA); Geoffrey McHardy, Carp (CA); Adrian Turcanu, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 16/767,369

(22) PCT Filed: Nov. 29, 2018

(86) PCT No.: PCT/IB2018/059467
§ 371 (c)(1),
(2) Date: May 27, 2020

(87) PCT Pub. No.: WO2019/106601
PCT Pub. Date: Jun. 6, 2019

(65) Prior Publication Data
US 2020/0389256 A1 Dec. 10, 2020

Related U.S. Application Data

(60) Provisional application No. 62/593,242, filed on Nov. 30, 2017.

(51) Int. Cl.
*H04L 1/18* (2006.01)

(52) U.S. Cl.
CPC .......... *H04L 1/1812* (2013.01); *H04L 1/1822* (2013.01); *H04L 1/1874* (2013.01)

(58) Field of Classification Search
CPC .... H04L 1/1812; H04L 1/1822; H04L 1/1874
See application file for complete search history.

(56) References Cited

U.S. PATENT DOCUMENTS 9,397,735 B2    7/2016   Nammi et al.
9,930,684 B2    3/2018   Hwang et al.
(Continued)

OTHER PUBLICATIONS

W. Lee, O. Simeone, J. Kang, S. Rangan and P. Popovski, "HARQ Buffer Management: An Information-Theoretic View," in IEEE Transactions on Communications, vol. 63, No. 11, pp. 4539-4550, Nov. 2015. (Year: 2015).*

(Continued)

*Primary Examiner* — Cynthia Britt
(74) *Attorney, Agent, or Firm* — Ericsson Canada Inc

(57) ABSTRACT

Embodiments of a method in a network node configured to transmit data using an automatic retransmission process are disclosed. The method comprises: receiving data to be transmitted to a remote endpoint; and when all process identifiers in a predetermined set of process identifiers are currently in use: selecting one process identifier from the predetermined set of process identifiers; storing information pertaining to a previously transmitted transport block in a temporary buffer, the previously transmitted transport block including the selected process identifier; and transmitting the received data in a second transport block including the selected process identifier.

26 Claims, 11 Drawing Sheets

(56) References Cited

U.S. PATENT DOCUMENTS

| | | | |
|---|---|---|---|
| 2013/0121289 A1* | 5/2013 | Terry | H04B 7/0413 |
| | | | 370/329 |
| 2014/0044028 A1 | 2/2014 | Nammi et al. | |
| 2014/0245094 A1* | 8/2014 | Kotecha | H04L 1/1896 |
| | | | 714/748 |
| 2018/0014298 A1 | 1/2018 | Sun et al. | |
| 2018/0287744 A1* | 10/2018 | Sundararajan | H04L 1/1819 |
| 2019/0327639 A1* | 10/2019 | Huang | H04L 1/188 |

OTHER PUBLICATIONS

ISR and Written Opinion from corresponding PCT Application PCT/IB2018/059467.

Ateeq Ur Rehman, et al, Performance of Cognitive Stop-and-Wait Hybrid Automatic Repeat Request in the Face of Imperfect Sensing, IEEE Access, vol. 4, Jul. 19, 2016, pp. 5489-5508.

* cited by examiner

RECEIVING A FIRST TRANSPORT BLOCK FROM A NETWORK NODE, THE FIRST TRANSPORT BLOCK USING A TRANSMISSION BUFFER IDENTIFIER (ID), WHEREIN BEFORE RECEIVING FEEDBACK FROM THE THE MOBILE DEVICE CORRESPONDING TO THE TRANSPORT BLOCK, THE NETWORK NODE TRANSMITS A SECOND TRANSPORT BLOCK TO THE MOBILE DEVICE, THE SECOND TRANSPORT BLOCK REUSING THE TRANSMISSION BUFFER ID
600

*FIGURE 6*

ENHANCED HARQ ALGORITHM FOR LARGE ROUND TRIP DELAY LINKS

CROSS-REFERENCE

The present disclosure is based on, and claims benefit of U.S. Provisional patent application No. 62/593,242 filed Nov. 30, 2017, the entire content of which is incorporated herein by reference.

TECHNICAL FIELD

The present disclosure relates to network communication protocols, and in particular to an enhanced Hybrid Automatic Repeat Request (HARQ) algorithm for large round trip delay links.

BACKGROUND

Hybrid Automatic Repeat Request (HARQ) is a known technique for ensuring accurate transmission of data between a pair of nodes, either or both of which may be network nodes or wireless devices in a communications network. Typically, data to be sent from one node to the other is assigned a HARQ Process Identifier (ID) and saved in a HARQ data transmission buffer in association with the HARQ Process ID. The data and the HARQ Process ID are then encapsulated in a transport block (such as a MAC Protocol Data Unit (PDU), data frame or subframe) and transmitted to the other node. Upon receipt of the transport block, the receiving node attempts to decapsulate the data and HARQ Process ID. If the data is successfully decapsulated, the receiving node generates a positive acknowledgment (ACK) including the HARQ Process ID, and sends it to the first (sending) node. Upon receipt of the ACK, the sending node uses the HARQ Process ID to release the associated HARQ data transmission buffer, which is then available to be used for storing future data. On the other hand, if the receiving node fails to successfully decapsulate the data, it generates a negative acknowledgment (NACK) including the HARQ Process ID, and sends it to the first (sending) node. Upon receipt of the NACK, the sending node uses the HARQ Process ID to encapsulate the data from the associated HARQ data transmission buffer in a new transport block for transmission to the receiving node. By this means, the sending node may resend data to the receiving node any desired number of times until it is successfully received by the receiving node.

Typically, each node is allocated a predefined number of HARQ Process IDs. For example, a set of eight (8) HARQ Process IDs may be allocated to each node. A HARQ process ID that has been transmitted by a sending node in a transport block but has not yet been received back from the remote node in an ACK/NACK is referred to as being "in-flight". In an example in which a given node is allocated a set of eight HARQ process IDs, that node can support up to eight HARQ processes simultaneously, meaning that there can be up to eight HARQ process IDs that are "in-flight" at any given time.

In Inter-eNB Carrier Aggregation (CA) deployments, secondary cell Medium Access Control (MAC) endpoints are physically located on external eNBs rather than being physically co-located with the Primary MAC endpoint. Depending on the latency of the X2 transport network link between the primary and secondary eNBs, there could be an additional transport delay that is incurred by data frames before they are transmitted over the air. In another example, a long front-haul (such as, for example, a long distance between a radio head and a Distributed Unit (DU) of an eNB) can cause increased transport delays. In all cases, increasing transport delay effectively increases the "Feedback loop Round Trip Time" for the corresponding secondary carrier. In some cases, this may lead to delayed ACK/NACK massaging and consequent blocking of data transmission due to late release of HARQ buffers. The delay in releasing the HARQ buffers is typically equal to or slightly larger than the transport delay between the Primary and Secondary eNBs. Blocking of data transmission results in a decrease of the maximum theoretical throughput in line with the additional delay.

FIG. 1 is a block diagram illustrating a network environment 100 including a Primary Cell (Pcell) 102 and a pair of external secondary cells (Scells) 104a and 104b. The primary cell 102 is served by a corresponding Primary access node (eNB$_1$) 108, and the secondary cells are served by respective external Secondary access nodes (eNB$_2$) 110a and 110b. A wireless device (such as a User Equipment, UE, device) 112 located in the Pcell 102 may establish wireless connections with either one or both of the primary eNB 108 and a secondary eNB 110a, as generally illustrated by the arrows in FIG. 1.

As shown in FIG. 1, in an Inter-eNB CA deployment, downlink data (such as MAC Protocol Data Units (PDUs)) destined for the wireless device 112 may first sent from the Primary eNB 108 to the secondary eNB 110a via a transport network (X2) link 114. The secondary eNB 110a may then transmit the downlink data over the air to the wireless device 112. In order to ensure reliability of the data transfer, a Hybrid Automatic Repeat Request (HARQ) technique (or any other similar automatic retransmission technique) may be implemented between the primary eNB 108 (as the sending node) and the wireless device 112 (as the receiving node). According to the Long-Term Evolution (LTE) standard, the maximum feedback loop round-trip-time (RTT) at the MAC level is equivalent to 8 subframes (as may be seen in FIGS. 2A, 2B). Therefore, assuming no retransmissions, the maximum number of simultaneous HARQ processes that would allow for continuous non-blocking transmission is 8. Non-blocking and blocking operations in an Automatic Repeat Request technique are illustrated in FIGS. 2A and 2B.

Referring to FIG. 2A, there is shown a transmission buffer 200 of a network node (such as the Primary eNB 108) which is configured to provide a respective process buffer 202 for each one of a set of eight HARQ process. Each process buffer 202 may be referenced using a respective buffer identifier (ID) (e.g. 0 . . . 7 as shown in FIG. 2A) which may also correspond with the HARQ process ID of the respective HARQ process. Also shown in FIG. 2A is the Feedback round trip time (RTT) which corresponds with the total time required for a transport block associated with a given HARQ process to be sent from the network node to the remote endpoint, and an acknowledgement (either ACK or NACK) to be returned to the network node from the remote endpoint. For example, a transport block (Tx(0)) associated with HARQ process (0) is sent (at 204) to the remote endpoint, which then sends an ACK message (ACK(0) at 206) back to the network node. In the example of FIG. 2A, the Feedback RTT corresponds with eight transmission time intervals, which means that the ACK(0) message 206 will be received by the network node and process buffer (0) released in time for HARQ process (0) to be used for transmitting new data destined for the remote endpoint. This represents a non-blocking scenario.

FIG. 2B illustrates a blocking scenario, in which the actual RTT is equivalent to nine subframes or more (due to Inter eNB propagation delays in the X2 link 114, for example). In this case, transmission of new data from the primary eNB 108 is blocked (due to the fact that all of the HARQ processes are in flight) for a period of time equal to the additional transport delay. In the scenario illustrated in FIG. 2B, the additional transport delay is equivalent to three transmission time intervals, which corresponds with three subframes. New data cannot be transmitted (and thus is blocked) until an ACK message is received to release one of the process buffers. This blocking causes user experience degradation due to increased network latency resulting from the blocked transmissions. Therefore, improved techniques for mitigating the negative effects of large round-trip delays are needed.

SUMMARY

An object of the present invention is to provide techniques that at least partially overcome one or more limitations of conventional automatic retransmission techniques described above.

In an aspect, the present invention provides a method performed by a network node for transmitting transport blocks to a remote node using an automatic retransmission mechanism. The example method can include transmitting a first transport block to the remote node using a particular transport process identifier. In addition, the method may include, before receiving feedback from the remote node corresponding to the first transport block, transmitting a second transport block to the remote endpoint using the transport process identifier.

In another aspect, the present invention provides a method in a network node configured to transmit data using an automatic retransmission process. The method comprises: receiving data to be transmitted to a remote endpoint; and when all process identifiers in a predetermined set of process identifiers are currently in use: selecting one process identifier from the predetermined set of process identifiers; storing information pertaining to a previously transmitted transport block in a temporary buffer, the previously transmitted transport block including the selected process identifier; and transmitting the received data in a second transport block including the selected process identifier.

In some embodiments the predetermined set of process identifiers comprises a set of eight process identifiers.

In some embodiments selecting one process identifier from the predetermined set of process identifiers comprises selecting an oldest in-flight process identifier.

In some embodiments each one of the predetermined set of process identifiers is associated with a respective process buffer. Each process buffer may have a respective process buffer identifier corresponding to its associated process identifier. Storing information pertaining to a previously transmitted transport block in a temporary buffer may comprise moving a content of the process buffer associated with the selected process identifier to the temporary buffer. The content may comprise the received data and the selected process identifier.

In some embodiments transmitting the received data in a second transport block comprises setting a new data indicator, NDI, flag of the second transport block to indicate that the received data in the second transport block is different than data in the first transport block.

Some embodiments further comprise: receiving, from the remote endpoint, an ACK message including the selected process identifier; and releasing the temporary buffer.

Some embodiments further comprise: receiving, from the remote endpoint, a NACK message including the selected process identifier; selecting a new process identifier; and retransmitting the received data in a third transport block including the new process identifier. Selecting a new process identifier may comprise selecting a next process identifier in sequence, such that a delay in retransmitting the received data, following receipt of the NACK message, is minimized. Retransmitting the received data may comprise moving the received data from the temporary buffer to the process buffer associated with the selected new process identifier. Retransmitting the received data in a third transport block may comprise setting a redundancy version, rv, of the third transport block to indicate that the received data in the third transport block is associated with a different process identifier than the received data in the second transport block.

In addition to the above method embodiments, the present disclosure also describes related devices, computer programs, processors etc. for carrying out the aspects of the methods, among other aspects described further below. Embodiments of a base station, communication system, and a method in a communication system are also disclosed.

The techniques presented herein may provide an advantage by eliminating the blocking of new data transmissions due to exhaustion of the transport process identifiers. This allows for achieving full throughput transmissions on radio links where the Round Trip Time (expressed as a number of transport blocks or subframes) exceeds the number of transport process identifiers allocated to any given node.

BRIEF DESCRIPTION OF THE DRAWINGS

The accompanying drawing figures incorporated in and forming a part of this specification illustrate several aspects of the disclosure, and together with the description serve to explain principles of the disclosure.

FIG. 6 is a flow chart illustrating a method in accordance with an example embodiment of the present invention;

DETAILED DESCRIPTION

Figure 1:
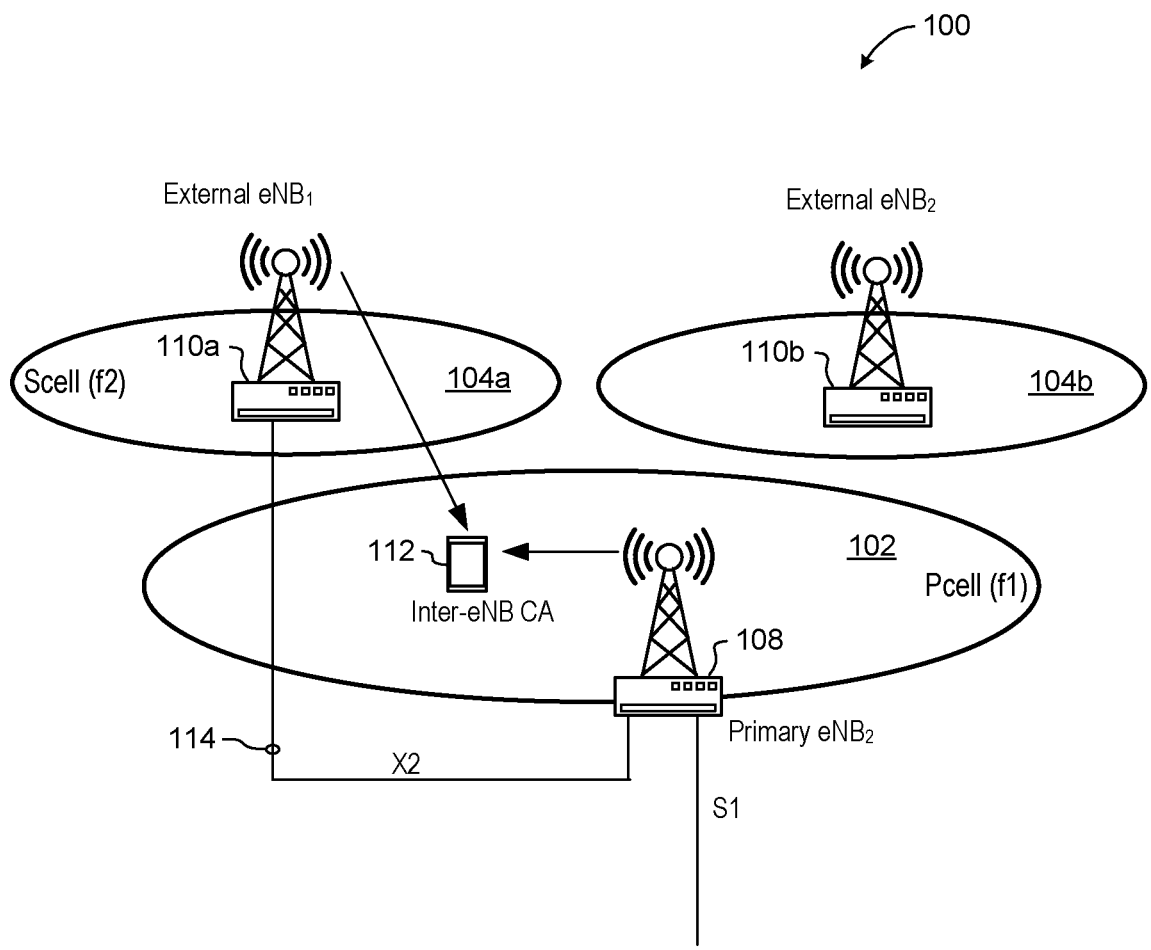
FIG. 1 is a block diagram illustrating a network in which embodiments of the present invention may be deployed.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting (and/or receiving) signals to (and/or from) a radio access node. Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Cell: As used herein, a "cell" is a combination of radio resources (such as, for example, antenna port allocation, time and frequency) that a wireless device may use to exchange radio signals with a radio access node, which may be referred to as a host node or a serving node of the cell. However, it is important to note that beams may be used instead of cells, particularly with respect to 5G NR. As such, it should be appreciated that the techniques described herein are equally applicable to both cells and beams.

Note that the description herein focuses on a 3GPP cellular communications system and, as such, 3GPP terminology or terminology similar to 3GPP terminology is oftentimes used. However, the concepts disclosed herein are not limited to a 3GPP system.

Systems and methods are disclosed herein that can prevent transmission blocking in an automatic retransmission mechanism (such as HARQ, for example) by allowing for a transport process identifier (such as a HARQ process ID, for example) to be reused while the same transport process identifier is still in flight in respect of a previously sent transport block. Since the transmission buffer identifier space is limited (e.g., to 8 subframes) but the transmission buffer (e.g. HARQ data transmission buffer) space is not limited, embodiments presented herein allow multiple transmission buffers to exist in association with the same transport process identifier. To achieve that end, the example embodiments described below reuse the transport process identifier (also referred to interchangeably herein as HARQ Process ID by example only, i.e. a transport process identifier need not be a HARQ Process ID in all embodiments) to transmit new data or for a retransmission before the feedback (ACK or NACK) is received for an in-flight process having a particular transport process identifier.

FIG. 1 illustrates a network node 108 and a remote endpoint 112 in a wireless communication system 100 according to one or more embodiments. In some embodiments, the network node 108 may be an eNB, a gNB or any other network device that may implement retransmission mechanisms. The remote endpoint 112 may be a UE or other wireless and/or mobile device, though generally can be any device or component configured to receive wireless transmissions and implement a retransmission mechanism.

Figure 3:
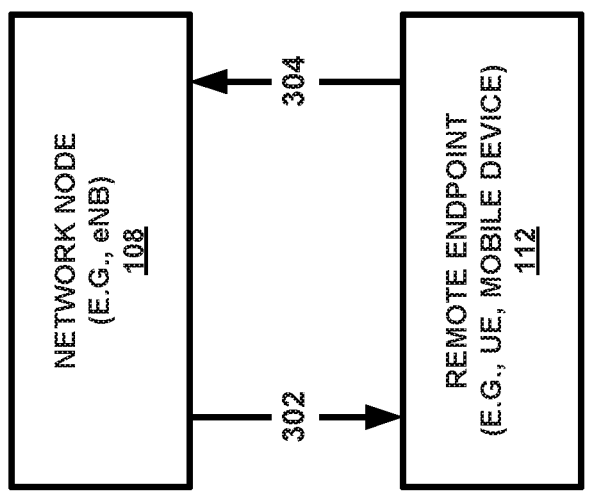
FIG. 3 is a block diagram illustrating interaction between a network node and a remote endpoint.

Referring to FIG. 3, the network node 108 may be configured to transmit transport blocks 302 containing data to the remote endpoint 112 using certain techniques described further below. The transport blocks 302 may contain new data (i.e data that has not previously been sent to the remote endpoint 112), or may contain old data that is being retransmitted by the network node 108 in response to a NACK message received from the remote endpoint 112. In some instances, the remote endpoint 112 may receive and decode the transport blocks 302 and/or retransmissions 304, determine whether they were correctly received, and may generate and transmit feedback 304 (such as positive acknowledgement (ACK) messages and negative acknowledgement (NACK) messages) corresponding to received transport blocks 302. According to an example implementation of the techniques described herein, transmissions of transport blocks 302 may contain a same transmission process ID, which may in some examples correspond with a process buffer ID and/or a HARQ process ID. Accordingly, in an aspect, before receiving feedback 304 from the remote endpoint 112 corresponding to a previously transmitted transport block 302, the network node 108 can transmit a second transport block 302a to the remote endpoint 112, the second transport block 302a using the same transmission process ID as the first transport block 302.

Further aspects of example embodiments will now be described. At least some of these embodiments may be described as applicable in certain contexts and/or wireless network types for illustrative purposes, but the embodiments are similarly applicable in other contexts and/or wireless network types not explicitly described. In addition, the embodiments below may be presented in the context of an LTE system and may therefore utilize terms specific to and/or utilized in systems implementing LTE standard protocol. Such description in the LTE context and the related terms are not limiting and are by way of example only. In other words, implementation of the present embodiments is not limited to implementation in LTE-compliant environments. Similarly, for ease of description, example embodiments are presented herein that utilize HARQ, and its associated terminology. However, it will be appreciated that the techniques disclosed herein are equally applicable to other automatic retransmission techniques known in the art or which may be developed in the future. Accordingly, where HARQ-specific terms are utilized in this disclosure, such HARQ specific terms should be understood as also referring to similar functionality in other non-HARQ automatic retransmission mechanisms. For instance, the term "feedback" can comprise HARQ responses (ACK, NACK for example), but can include other feedback in other feedback mechanisms, and furthermore "HARQ responses" should be understood as being replaceable by specific feedback from other retransmission mechanisms, or even no specific explicit feedback signal(s) at all.

Figure 2A:
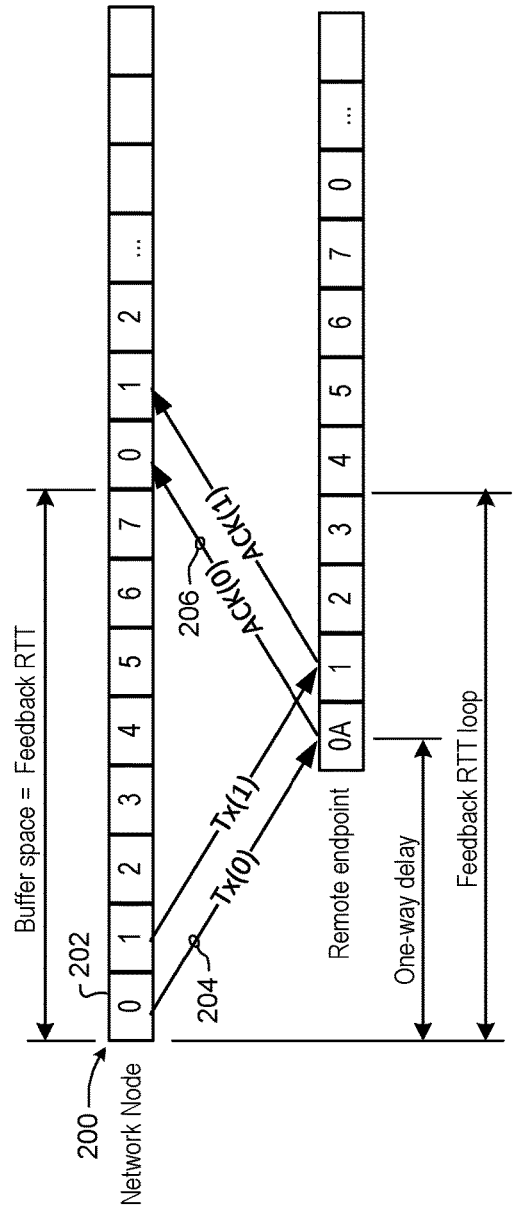
FIGS. 2A and 2B schematically illustrate non-blocking and blocking operation in an Automatic Repeat Request process.
Figure 2B:
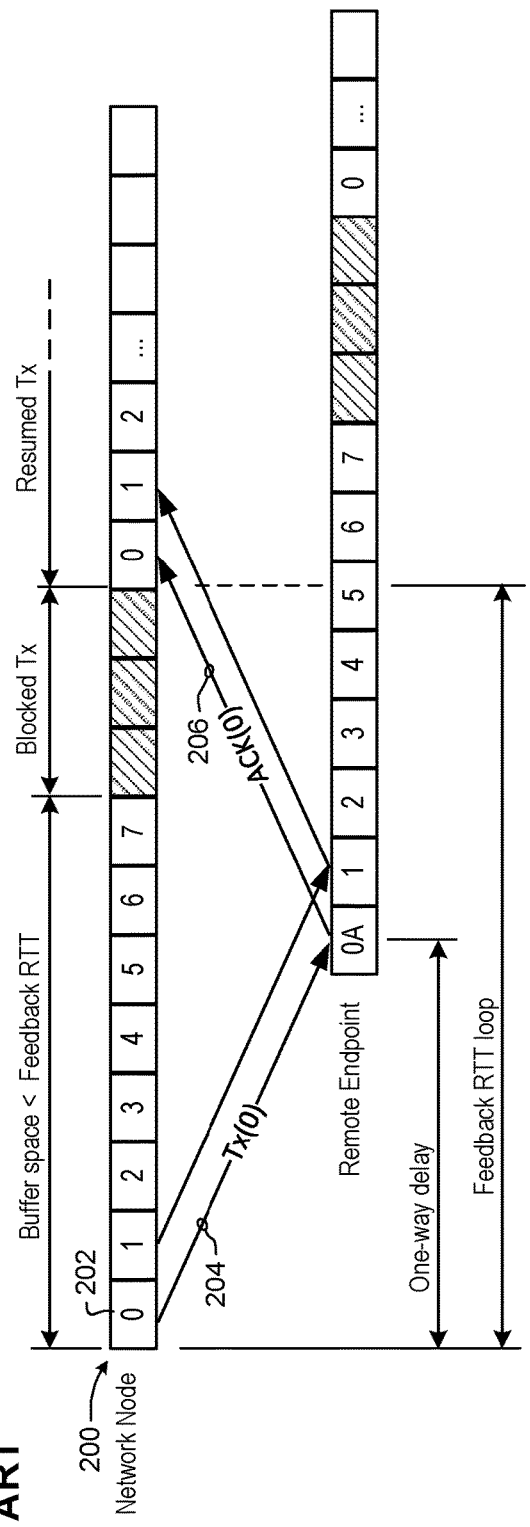
Figure 4:
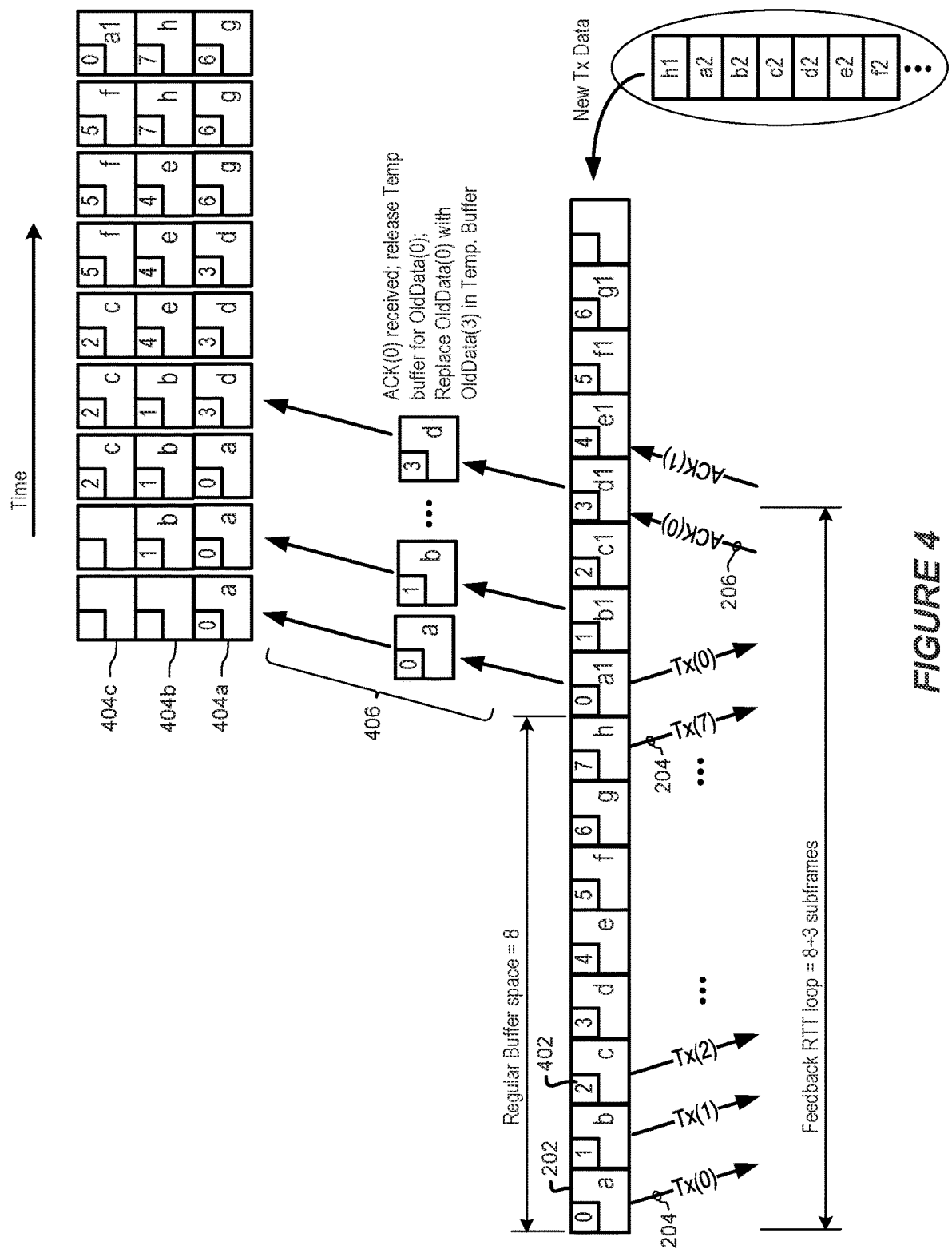
FIG. 4 is a block diagram illustrating operation of a method in accordance with an example embodiment of the present invention.

FIG. 4 illustrates operation of an automatic retransmission system implementing techniques in accordance with an example embodiment of the present invention. In the example of FIG. 4, the network node 108 includes a transmission buffer 200 including a respective process buffer 202 for each ARQ process. As described above with reference to FIG. 2, the number of process buffers 202 corresponds with the configured number of automatic retransmission processes which, in the LTE standard, is eight. Each process buffer 202 may be identified by a process buffer ID 402. In some embodiments, each process buffer 202 may be associated with a particular automatic retransmission process. In some embodiments, the process buffer ID 402 may correspond with the process ID of its associated automatic retransmission process.

In addition, the network node 108 includes a set of temporary buffers 404 configured to store information of transport blocks for which process IDs are being reused, as will be described in greater detail below. The number of temporary buffers is dependent on the total Feedback RTT, and may vary with time. In general, the number of temporary buffers may be obtained as:

Number of Temp. Buffers=Feedback RTT−Number of Process buffers

For example, in the embodiment of FIG. 4, the number of process buffers 202 is 8, while the Feedback RTT corresponds with 11 subframes. In this case, a set of 3 (=11−8) temporary buffers 404 is required.

In operation, a data block to be transmitted is assigned to an automatic retransmission process and loaded into the associated process buffer 402 in a conventional manner. In a scenario in which the Feedback RTT is equal to or less than the number of automatic retransmission processes (or equivalently, the number of process buffers 402), the content of each process buffer 402 can be transmitted in respective transport blocks 204 and the process buffer 402 subsequently released following receipt of the corresponding ACK message 206, also in a conventional manner.

On the other hand, FIG. 4 shows a scenario in which the Feedback RTT is greater than the number of automatic retransmission processes (process buffers 402). In this case, a new data block to be transmitted is received by the network node 108 before one of the process buffers 202 can be released to accept the new data block. For example, FIG. 4 shows a scenario in which process buffers (0) through (7) contain data blocks "a" through "h", and all of the applicable transport blocks 204 (and process IDs) are in-flight. In conventional methods, new data blocks would have to be delayed (i.e. blocked) until one of the eight process buffers 202 is released in response to receipt of the corresponding ACK message 206.

In accordance with the present techniques, this problem is avoided by storing information of an in-flight process ID in a temporary buffer 404, and releasing the associated process buffer 202 to accept the new data block.

For example, when a new data block a1 is received, information of data block "a", which is located in process buffer (0), can be stored in temporary buffer 404a, as shown in FIG. 4 at 406. This releases process buffer (0) to receive new data block a1, which can therefore be transmitted in a transport block 204 with the applicable process ID (0). This results in the process ID (0) being used (that is, it is "in-flight") in respect of two different data blocks.

In some embodiments, the transport block 204 may include a new data indicator (NDI) flag, which can be set to indicate whether or not the process ID associated with the data block is being re-used. For example, the transport block 204 carrying data block a1 is associated with process ID (0), which is already in-flight in respect of old data block "a". Accordingly, the NDI flag of the transport block 204 carrying data block a1 can be set to indicate that the process ID (0) is being re-used. In some embodiments, the remote endpoint may use the NDI flag value during decoding of the data block.

When a new data block b1 is received, information of old data block "b", which is located in process buffer (1), can be stored in temporary buffer 404b. This releases process buffer (1) to receive the new data block b1, which can therefore be transmitted in a transport block 204 with the applicable process ID (1), and the NDI flag set to indicate that the process ID (1) is being re-used.

Similarly, when a new data block c1 is received, information of old data block "c", which is located in process buffer (2), can be stored in temporary buffer 404c. This releases process buffer (2) to receive the new data block c1, which can therefore be transmitted in a transport block 204 with the applicable process ID (2), and the NDI flag set to indicate that the process ID (2) is being re-used.

When the ACK(0) message 206 pertaining to process ID (0) is received, there are 2 in-flight processes relating to that process ID. Since the remote endpoint 112 handles transport blocks in sequence, it can be assumed that the received ACK(0) message pertains to the oldest in-flight process associated with that process ID. Accordingly, the temporary buffers 404 can be searched using the process ID of the received ACK(0) message, which in the illustrated example will find the information pertaining to old data "a" located in temporary buffer 404a. Accordingly, temporary buffer 404a can be released, and so becomes available to store information of old data block "d", which is located in process buffer (3). This process buffer thus becomes available to store information of new data "d1", which can therefore be transmitted in a transport block 204 with the applicable process ID (3), and the NDI flag set to indicate that the process ID (3) is being re-used.

As illustrated in the example of FIG. 4, when transport blocks 204 are in-flight (i.e. waiting for feedback 304 after transmission) and there is new data to be transmitted, the transmission buffer corresponding to the oldest in-flight process ID (K) may be reused for the new data transmission. In an aspect, the process buffer ID K can be placed in a temporary buffer 404, indicating that it has been "reused" for a subsequent transmission/retransmission as well. Later, when feedback arrives for process ID K, a network node can search the temporary buffer 404 to determine if the process ID K has been reused. If present in the temporary buffer 404, the feedback can be assigned to the earlier transport block with the process ID K.

By way of further example, the process of FIG. 4 may be described as follows:

After the standard 8 Transmission Time Intervals (TTIs), transport blocks (TBs) 204 carrying data blocks a, b, c, d, e, f, g, and h (corresponding to transmission buffer IDs (process IDs) 0-7) have been transmitted to the remote endpoint, and new data (represented by data blocks a1 . . . h1) has been received for transmission. In an aspect, this may represent an implementation of block 600 in FIG. 6, below.

In TTI 9, feedback has not yet arrived for TBs 204 carrying any of data blocks "a" through "h". Therefore, one of the process IDs 0-7 is selected for reuse. Any suitable criteria may be used to select the process ID to be reused. For example, in some embodiments, the oldest in-flight process ID (e.g. process ID=0 in the example of FIG. 4) may be selected for reuse. In some embodiments, selection of the process ID to be reused is based on a data type of the data block previously transmitted using that process ID. For example, the process ID to be reused may be selected from among a set of in-flight process IDs that are associated with Data Radio Bearer (DRB) data, for example. Alternatively, the process ID to be reused may be selected from among a set of in-flight process IDs that are not associated with Signaling Radio Bearer (SRB) data, for example. In the example of FIG. 4, process ID=0 is selected for reuse. Therefore, the process buffer (0) for TB 204 carrying data block "a" is marked as "reused" by moving it to a temporary buffer 404a.

In TTI 9, process ID=0 is reused to transmit a new TB 204 carrying data block "a1". In such a scenario, a New Data Indicator (NDI) flag is toggled, indicating to the remote endpoint that new data is transmitted for process ID=0.

In TTI 10, feedback has not yet arrived for either TB 204 carrying data block "a" or TB 204 carrying data block "b". Therefore, the process buffer for TB(1) 204 carrying data block "b" is marked as reused by moving it to temporary buffer 404b.

In TTI 10, process r ID=1 is selected to be reused to transmit a new TB 204 carrying data block "b1". The temporary buffer now contains information related to TBs carrying data blocks a and b. The NDI flag is toggled, indicating to the remote endpoint that new data is transmitted for process ID=1.

In TTI 11, feedback still did not yet arrive for TBs 204 carrying data blocks a, b or c. Therefore, the process buffer for TB 204 carrying data block "c" is marked as reused by moving it to temporary buffer 404c.

In TTI 11, process ID=2 is selected to be reused to transmit a new TB 204 carrying data block "c1". The temporary buffer now contains information related to TBs 204 carrying data blocks a, b and c. Again, the NDI flag is toggled, indicating to the UE that new data is transmitted for process ID=2

In TTI 12, ACK feedback arrives for process ID=0. A temporary buffer 404a containing information of data block a, waiting for feedback that was originally transmitted with process ID=0 is found. The feedback is processed, the transmission for TB 204 carrying data block a is ACKnowledged and the information for data block a is removed from the temporary buffer 404a. The temporary buffer 404 now contains information of data blocks b and c In TTI 12, feedback has not arrived for TBs 204 carrying data blocks b, c or d. Therefore, the process buffer for the TB 204 carrying data block d is marked as "reused" by moving it to the temporary buffer 404a.

In TTI 12, process ID=3 is selected to be reused to transmit a new TB 204 carrying data block d1. The temporary buffer 404 now contains information related to TBs 204 carrying data blocks b, c and d; The NDI flag is toggled, indicating to the UE that new data (d1) is transmitted for process ID=3.

In some examples, the subsequent processing continues following the above pattern.

The pattern of FIG. 4 also works when a negative acknowledgement (NACK) is received from the UE for a particular transport block. However, in such a scenario, soft combining of redundancy versions of TBs/retransmissions cannot be used because a new TB is already in flight for the same process ID/buffer ID with an NDI flag toggled (indicating new data), which will force the UE to overwrite the data block of the NACKed TB with the data block of the new in-flight TB.

While this may not have a pronounced negative effect in good radio conditions (due to a very low rate of NACK), in poorer RF conditions it is desirable to use soft-combining to increase the chance of properly decoding the TB. Another form of feedback for the present disclosure is an absence of feedback, which, for instance in the LTE technology is denoted as discontinuous transmission (DTX). For the purpose of this disclosure, a DTX determination (e.g., explicit or via a timer expiry) and NACK can be treated in the same manner. Accordingly, in examples where a NACK is received or a DTX is determined, a NACK/DTX rate measurement mechanism is needed to switch off the enhanced automatic retransmission/HARQ algorithm when the NACK rate exceeds a certain threshold.

Figure 5:
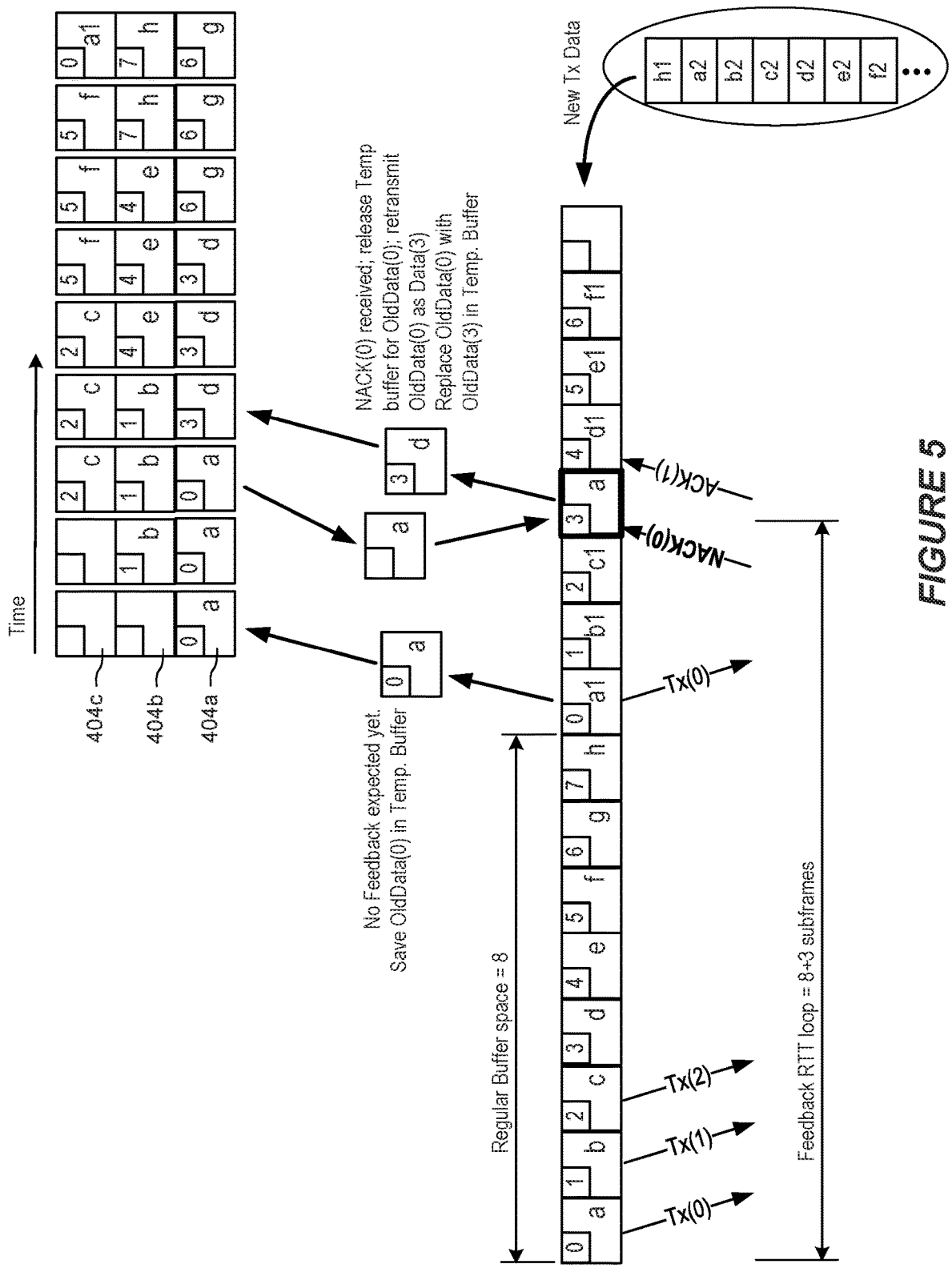
FIG. 5 is a block diagram illustrating operation of a method in accordance with another example embodiment of the present invention.

FIG. 5 shows an example in which the feedback received for the TB 204 carrying data block a in TTI 12 is NACK. In an example case implementing a NACK feedback event (or DTX determination):

In TTI 12, NACK feedback arrives for process ID=0. An in-flight TB waiting for feedback that was previously transmitted with process ID=0 is found in the temporary buffer 404a. The feedback is processed and because the feedback is NACK, the data block (in this case, old data block "a") stored in the temporary buffer 404a is moved to the next available process buffer (which in this case is process buffer associated with process ID=3) and a TB 204 carrying data block "a" is retransmitted with the corresponding process ID. Since transmitting this TB 204 with a redundancy version (rv) of "1" will not help in this case (rv=0 will be overwritten by the TB 204 carrying data block a1), the NDI flag is toggled to indicate to the UE that this is a new transmission.

In TTI 12, feedback still did not yet arrive for the TB carrying data block "d". Therefore, the process buffer for the TB 204 carrying data block d is marked as "reused" by moving it to the temporary buffer 404. The temporary buffers 404 now contain information pertaining the TBs carrying data blocks b, c and d.

Further processing may continue as described above with reference to FIG. 4.

In an aspect, the following pseudocode illustrates the processing needed when new data (e.g. new TB) is processed:

```
TxNewData( )
{
txBuffer[8]; // tx data buffer, size = number of
buffer references
tempBuffer[TRANSPORT_LATENCY]; // temp storage
buffer, size = delay due to transport network expressed
in subframes
inputBuffer[ ]; // array of new user data to be
transmitted
Next;      // Index pointing to the next user data to be
transmitted
```

```
When new data is scheduled:
// newData contains the new data to be transmitted
    if(txBuffer full) {
            // Still need to wait for feedback to arrive
    for the OldestHarqId
            dataToSave = txBuffer[OldestHarqId];
            SaveToTempBuffer(dataToSave , OldestHarqId);
            txBuffer[OldestHarqId] = inputBuffer[next++];
            Transmit(txBuffer[OldestHarqId]);
    } else {
            // Legacy harq
            harqId = GetNextAvailableHarqId( );
            txBuffer[harqId] = inputBuffer[next++];
            Transmit(txBuffer[harqId]);
    }
}
```

The following pseudocode illustrates the processing needed when feedback is received:

```
ReceiveFeedback( )
{
txBuffer[8]; // tx data buffer,
size = number of buffer references
tempBuffer[TRANSPORT_LATENCY] // temp storage
buffer, size = delay due to transport network expressed
in subframes
When Feedback is arrives or is supposed or arrive:
    ackHarqId = harqId from the ACK message;
    if(RxFeedback == ACK) {
        if (ackHarqId in temp buffer) {
            Free(tempBuffer[ackHarqId]);
        } else { // ackHarqId is in the regular buffer
space
            Free(txBuffer[ackHarqId]);
        }
    } else { // RxFeedback is NACK or DTX
        if (ackHarqId in temp buffer)
            dataToReTx = Find(tempBuffer,
ackHarqId);
            dataToSave = txBuffer[OldestHarqId];
            SaveToTempBuffer(dataToSave ,
OldestHarqId);
            Retransmit (dataToReTx,
OldestHarqId);
        } else { // ackHarqId is in the regular buffer
space
            Free(txBuffer[ackHarqId]); //
ackHarqId can now be used for a new transmission
        }
    }
}
```

FIG. 6 depicts a method in accordance with particular embodiments. The method can be performed by a mobile device/UE 102 and can be for receiving transport blocks using an automatic retransmission mechanism. The example method includes, at block 600, receiving a first transport block from a network node, the first transport block including a process identifier (ID), wherein before receiving feedback from the mobile device corresponding to the transport block, the network node transmits a second transport block to the mobile device, the second transport block reusing the process ID.

Though not shown explicitly in the figure, the method may include any of the following aspects. The method may also include receiving the second transport block. The method may also include transmitting feedback to the network node concerning one or both of the first transport block and the second transport block.

In an aspect, the feedback comprises an acknowledgement message (ACK) or a negative acknowledgement message (NACK). Also, in some examples, the second transport block comprises a New Data Indicator (NDI) flag.

Figure 7:
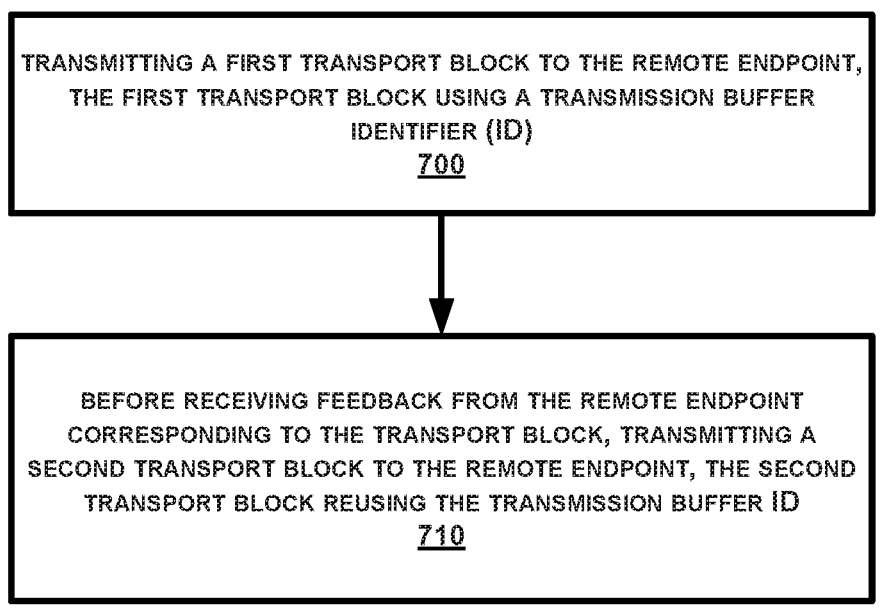
FIG. 7 is a flow chart illustrating a method in accordance with another example embodiment of the present invention.

FIG. 7 depicts a method in accordance with other particular embodiments. The method can be performed by a network node 106 for transmitting transport blocks to a remote endpoint using an automatic retransmission mechanism. It can include, at block 700, transmitting a first transport block to the remote endpoint, the first transport block including a process identifier (ID). At block 710, the method can include, before receiving feedback from the remote endpoint corresponding to the transport block, transmitting a second transport block to the remote endpoint, the second transport block reusing the process ID.

Though not explicitly shown in the figure, the method can include moving information in a process buffer pertaining to the first transport block to a temporary buffer responsive to including the process ID in the second transport block. The method can include receiving an acknowledgement message (ACK) from the remote endpoint as feedback corresponding to the first transport block, and removing the information pertaining to the first transport block from the temporary buffer responsive to the received ACK. The method can include setting a New Data Indicator (NDI) flag on the second transport block prior to transmission. The method can also include receiving a negative acknowledgement message (NACK) from the remote endpoint as feedback corresponding to the first transport block, and responsive to the received NACK, retransmitting the first transport block to the remote endpoint, the retransmitted first transport block including a New Data Indicator (NDI) flag; and moving the information pertaining to the first transport block from the temporary buffer to a process buffer for the retransmitted first transport block. The method can include determining that no feedback corresponding to the first transport block has been received from the UE, and in response, retransmitting the first transport block to the remote endpoint, the retransmitted first transport block including a New Data Indicator (NDI) flag and moving the information pertaining to the first transport block from the temporary buffer to the process buffer for the retransmitted first transport block. The automatic retransmission mechanism can be a hybrid automatic repeat request (HARQ), the remote endpoint can be a user equipment (UE), and the transmission buffer ID can be a HARQ process ID in any of the above methods or embodiments thereof.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 8:
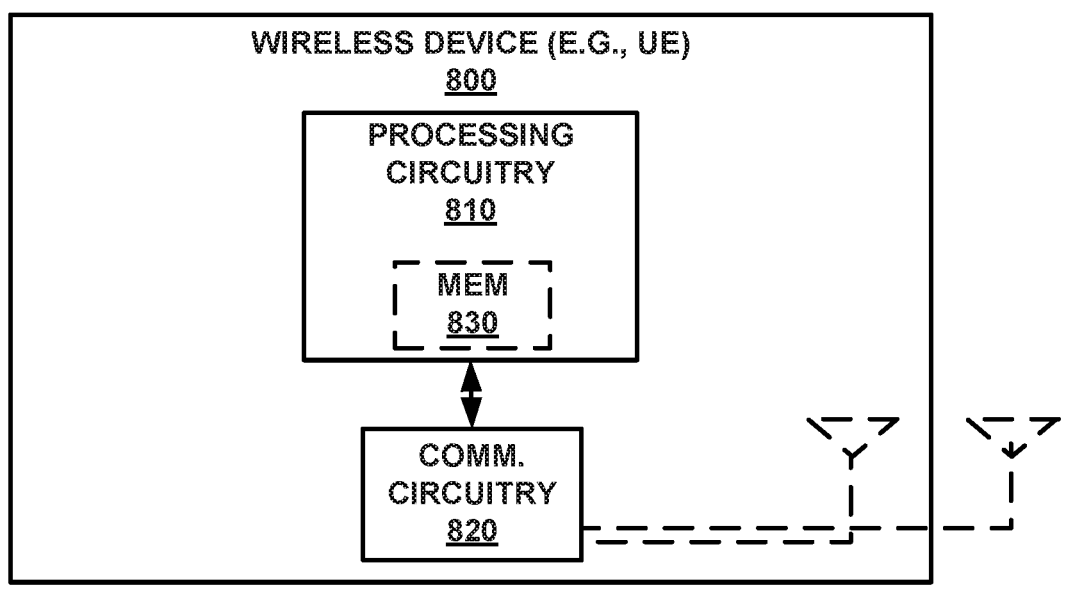
FIG. 8 is a schematic block diagram of a radio access node according to some embodiments of the present disclosure.

FIG. 8 for example illustrates a wireless device 800 as implemented in accordance with one or more embodiments. As shown, the wireless device 800 includes processing circuitry 810 and communication circuitry 820. The communication circuitry 820 (e.g., radio circuitry) is configured to transmit and/or receive information to and/or from one or more other nodes, e.g., via any communication technology. Such communication may occur via one or more antennas that are either internal or external to the wireless device 800. The processing circuitry 810 is configured to perform processing described above, such as by executing instructions stored in memory 830. The processing circuitry 810 in this regard may implement certain functional means, units, or modules.

Figure 9:
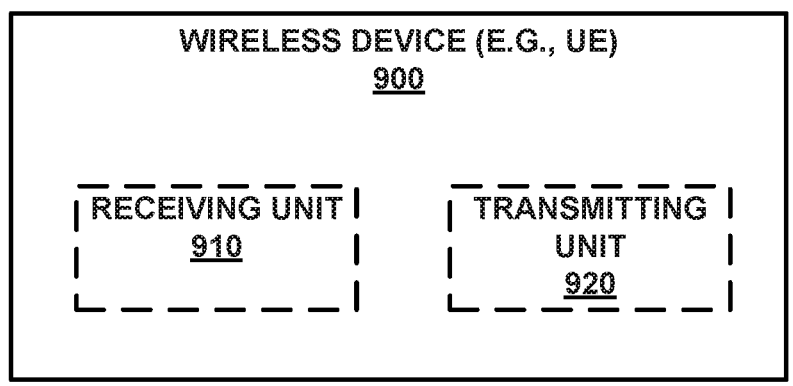
FIG. 9 is a schematic block diagram of a radio access node according to some embodiments of the present disclosure.

FIG. 9 illustrates a schematic block diagram of a wireless device 900 in a wireless network according to still other embodiments (for example, the wireless network shown in FIG. 12). As shown, the wireless device 900 implements various functional means, units, or modules, e.g., via the processing circuitry 810 in FIG. 8 and/or via software code. These functional means, units, or modules, e.g., for implementing the method(s) herein, include for instance: receiving unit 910 for performing block 600 of FIG. 6 and transmitting unit 920 for transmitting feedback.

Figure 10:
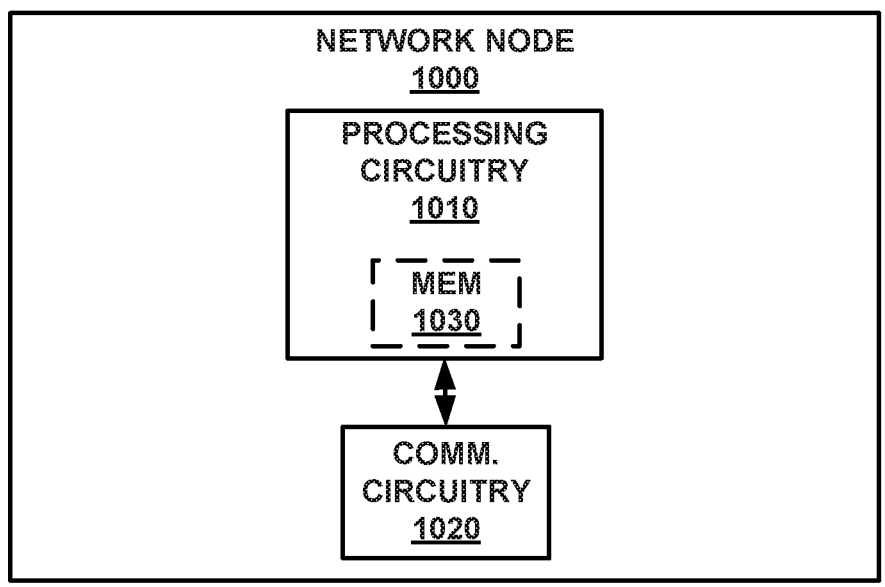
FIG. 10 is a schematic block diagram that illustrates a virtualized embodiment of the radio access node of FIG. 9 according to some embodiments of the present disclosure.

FIG. 10 illustrates a network node 1000 as implemented in accordance with one or more embodiments. As shown, the network node 1000 includes processing circuitry 1010 and communication circuitry 1020. The communication circuitry 1020 is configured to transmit and/or receive information to and/or from one or more other nodes, e.g., via any communication technology. The processing circuitry 1010 is configured to perform processing described above, such as by executing instructions stored in memory 1030. The processing circuitry 1010 in this regard may implement certain functional means, units, or modules.

Figure 11:
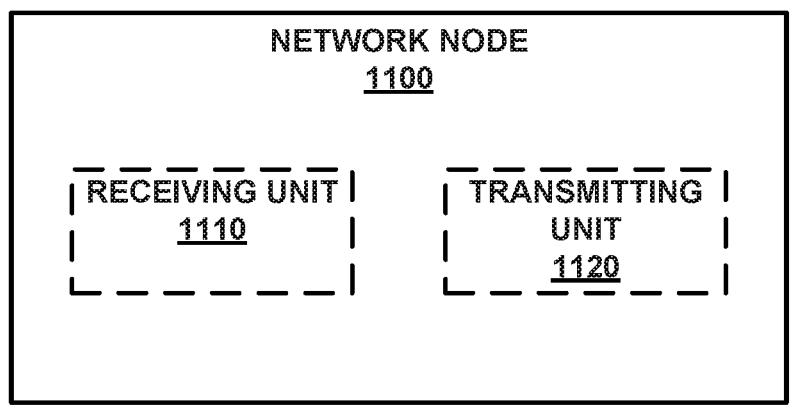
FIG. 11 is a schematic block diagram of the radio access node of FIG. 9 according to some other embodiments of the present disclosure.

FIG. 11 illustrates a schematic block diagram of a network node 1100 in a wireless network according to still other embodiments. As shown, the network node 1100 implements various functional means, units, or modules, e.g., via the processing circuitry 1010 in FIG. 10 and/or via software code. These functional means, units, or modules, e.g., for implementing the method(s) herein, include for instance: transmitting unit 1120 for performing block 700 and 710 of FIG. 7 and receiving unit 900 for receiving feedback.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of a computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Embodiments of the present invention are defined in the appended claims. Alternative example embodiments may be summarized as follows:

Group A Embodiments

A1. A method performed by a mobile device for receiving transport blocks using an automatic retransmission mechanism, comprising:
receiving a first transport block from a network node, the first transport block using a transmission buffer identifier (ID), wherein before receiving feedback from the mobile device corresponding to the transport block, the network node transmits a second transport block to the mobile device, the second transport block reusing the transmission buffer ID.

A2. The method of embodiment A1, further comprising receiving the second transport block.

A3. The method of either of the previous embodiments, further comprising transmitting feedback to the network node concerning one or both of the first transport block and the second transport block.

A4. The method of embodiment A3, wherein the feedback comprises an acknowledgement message (ACK) or a negative acknowledgement message (NACK).

A5. The method of any of the previous embodiments, wherein the second transport block comprises a New Data Indicator (NDI) flag.

A6. The method of any of the previous embodiments, wherein the automatic retransmission mechanism is hybrid automatic repeat request (HARQ).

A7. The method of any of the previous embodiments, wherein the mobile device is a user equipment (UE).

A8. The method of any of the previous embodiments, wherein the transmission buffer ID is a HARQ process ID.

A9. The method of any of the previous embodiments, further comprising:
providing user data; and
forwarding the user data to a host computer via a transmission to the network node (e.g., a base station).

Group B Embodiments

B1. A method performed by a network node for transmitting transport blocks to a remote endpoint using an automatic retransmission mechanism, comprising:
transmitting a first transport block to the remote endpoint, the first transport block using a transmission buffer identifier (ID); and
before receiving feedback from the remote endpoint corresponding to the transport block, transmitting a second transport block to the remote endpoint, the second transport block reusing the transmission buffer ID.

B2. The method of embodiment B1, further comprising moving an entry in a transmission buffer for the first transport block to a temporary transmission buffer list from a persistent transmission buffer for the first transport block responsive to reusing the transmission buffer ID.

B3. The method of embodiment B2, further comprising:
receiving an acknowledgement message (ACK) from the remote endpoint as feedback corresponding to the first transport block; and
removing the first transport block from the temporary transmission buffer list responsive to the received ACK.

B4. The method of any of embodiments B1-B3, further comprising setting a New Data Indicator (NDI) flag on the second transport block for transmission.

B5. The method of any of embodiments B2-B4, further comprising receiving a negative acknowledgement message (NACK) from the remote endpoint as feedback corresponding to the first transport block, and responsive to the received NACK:

retransmitting the first transport block to the remote endpoint, the retransmitted first transport block including a New Data Indicator (NDI) flag; and moving the first transport block from the temporary transmission buffer list to the persistent transmission buffer for the first transport block.

B6. The method of any of embodiments B2-B4, further comprising determining that no feedback corresponding to the first transport block has been received from the UE, and in response:

retransmitting the first transport block to the remote endpoint, the retransmitted first transport block including a New Data Indicator (NDI) flag; and moving the first transport block from the temporary transmission buffer list to the persistent transmission buffer for the first transport block.

B7. The method of any of the previous embodiments, wherein the automatic retransmission mechanism is hybrid automatic repeat request (HARQ).

B8. The method of any of the previous embodiments, wherein the remote endpoint is a user equipment (UE).

B9. The method of any of the previous embodiments, wherein the transmission buffer ID is a HARQ process ID.

B10. The method of any of the previous embodiments, further comprising:

obtaining user data; and forwarding the user data to a host computer or a wireless device (e.g., a UE).

Group C Embodiments

C1. A wireless device configured to perform any of the steps of any of the Group A embodiments.

C2. A wireless device comprising:

processing circuitry configured to perform any of the steps of any of the Group A embodiments; and power supply circuitry configured to supply power to the wireless device.

C3. A wireless device comprising:

processing circuitry and memory, the memory containing instructions executable by the processing circuitry whereby the wireless device is configured to perform any of the steps of any of the Group A embodiments.

C4. A user equipment (UE) comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

C5. A computer program comprising instructions which, when executed by at least one processor of a wireless device, causes the wireless device to carry out the steps of any of the Group A embodiments.

C6. A carrier containing the computer program of embodiment C5, wherein the carrier is one of an electronic signal, optical signal, radio signal, or computer readable storage medium.

C7. A base station configured to perform any of the steps of any of the Group B embodiments.

C8. A base station comprising:

processing circuitry configured to perform any of the steps of any of the Group B embodiments;

power supply circuitry configured to supply power to the wireless device.

C9. A base station comprising:

processing circuitry and memory, the memory containing instructions executable by the processing circuitry whereby the base station is configured to perform any of the steps of any of the Group B embodiments.

C10. A computer program comprising instructions which, when executed by at least one processor of a base station, causes the base station to carry out the steps of any of the Group B embodiments.

C11. A carrier containing the computer program of embodiment C10, wherein the carrier is one of an electronic signal, optical signal, radio signal, or computer readable storage medium.

Group D Embodiments

D1. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

D2. The communication system of the pervious embodiment further including the base station.

D3. The communication system of the previous 2 embodiments, further including the UE, wherein the UE is configured to communicate with the base station.

D4. The communication system of the previous 3 embodiments, wherein:

the processing circuitry of the host computer is configured to execute a host application, thereby providing the user data; and the UE comprises processing circuitry configured to execute a client application associated with the host application.

D5. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:

the processing circuitry of the host computer is configured to execute a host application, thereby providing the user data; and the UE's processing circuitry is configured to execute a client application associated with the host application.

D12. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:

the processing circuitry of the host computer is configured to execute a host application; and the UE's processing circuitry is configured to execute a client application associated with the host application, thereby providing the user data.

D18. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

D19. A method implemented in a communication system including a host computer, a base station and a user equipment (UE), the method comprising:

at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:

at the UE, executing a client application, thereby providing the user data to be transmitted; and at the host computer, executing a host application associated with the client application.

D22. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:

the processing circuitry of the host computer is configured to execute a host application;

the UE is configured to execute a client application associated with the host application, thereby providing the user data to be received by the host computer.

D27. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

Those skilled in the art will recognize improvements and modifications to the embodiments of the present disclosure. All such improvements and modifications are considered within the scope of the concepts disclosed herein.

The invention claimed is:

1. A method in a network node configured to transmit transport blocks to a remote endpoint using an automatic retransmission process, the method comprising:
   transmitting a first transport block to the remote endpoint, the first transport block including a process identifier (ID) of the automatic retransmission process; and
   subsequent to transmitting the first transport block and before receiving feedback from the remote endpoint pertaining to the first transport block, transmitting a second transport block to the remote endpoint, the second transport block including the process ID.

2. A method in a network node configured to transmit data using an automatic retransmission process, the method comprising:
   receiving data to be transmitted to a remote endpoint; and
   when all process identifiers in a predetermined set of process identifiers are currently in flight:
      selecting one in-flight process identifier from the predetermined set of process identifiers;
      storing information pertaining to a previously transmitted transport block in a temporary buffer, the previously transmitted transport block including the selected in-flight process identifier; and
      transmitting the received data in a second transport block including the selected in-flight process identifier.

3. The method of claim 2, wherein the predetermined set of process identifiers comprises a set of eight process identifiers.

4. The method of claim 2, wherein selecting one process identifier from the predetermined set of process identifiers comprises selecting an oldest in-flight process identifier.

5. The method of claim 2, wherein each one of the predetermined set of process identifiers is associated with a respective process buffer.

6. The method of claim 5, wherein each process buffer has a respective process buffer identifier corresponding to its associated process identifier.

7. The method of claim 5, wherein storing information pertaining to a previously transmitted transport block in a temporary buffer comprises moving a content of the process buffer associated with the selected process identifier to the temporary buffer.

8. The method of claim 7, wherein the content comprises the received data and the selected process identifier.

9. The method of claim 2, wherein transmitting the received data in a second transport block comprises setting a new data indicator, NDI, flag of the second transport block to indicate that the received data in the second transport block is different than data in the first transport block.

10. The method of claim 2, further comprising:
    receiving, from the remote endpoint, an ACK message including the selected in-flight process identifier; and
    releasing the temporary buffer.

11. The method of claim 2, further comprising:
    receiving, from the remote endpoint, a NACK message including the selected in-flight process identifier;
    selecting a new process identifier; and
    retransmitting the received data in a third transport block including the new process identifier.

12. The method of claim 11, wherein selecting a new process identifier comprises selecting a next process identifier in sequence, such that a delay in retransmitting the received data, following receipt of the NACK message, is minimized.

13. The method of claim 11, wherein retransmitting the received data comprises moving the received data from the temporary buffer to the process buffer associated with the selected new process identifier.

14. The method of claim 11, wherein retransmitting the received data in a third transport block comprises setting a redundancy version, rv, of the third transport block to indicate that the received data in the third transport block is associated with a different process identifier than the received data in the second transport block.

15. A network node configured to transmit data using an automatic retransmission process, the network node comprising:
    at least one processor operative under control of software instructions stored on a non-transitory computer readable medium to execute a process comprising:
       receiving data to be transmitted to a remote endpoint; and
       when all process identifiers in a predetermined set of process identifiers are currently in flight:
          selecting one in-flight process identifier from the predetermined set of process identifiers;
          storing information pertaining to a previously transmitted transport block in a temporary buffer, the previously transmitted transport block including the selected in-flight process identifier; and
          transmitting the received data in a second transport block including the selected in-flight process identifier.

16. The network node of claim 15, wherein selecting one process identifier from the predetermined set of process identifiers comprises selecting an oldest in-flight process identifier.

17. The network node of claim 15, wherein each one of the predetermined set of process identifiers is associated with a respective process buffer.

18. The network node of claim 17, wherein each process buffer has a respective process buffer identifier corresponding to its associated process identifier.

19. The network node of claim 17, wherein storing information pertaining to a previously transmitted transport block in a temporary buffer comprises moving a content of the process buffer associated with the selected process identifier to the temporary buffer.

20. The network node of claim 19, wherein the content comprises the received data and the selected process identifier.

21. The network node of claim 15, wherein transmitting the received data in a second transport block comprises setting a new data indicator, NDI, flag of the second transport block to indicate that the received data in the second transport block is different than data in the first transport block.

22. The network node of claim 15, wherein the at least one processor is further operative under control of software instructions stored on the non-transitory computer readable medium to execute steps of:
    receiving, from the remote endpoint, an ACK message including the selected in-flight process identifier; and
    releasing the temporary buffer.

23. The network node of claim 15, wherein the at least one processor is further operative under control of software instructions stored on the non-transitory computer readable medium to execute steps of:
    receiving, from the remote endpoint, a NACK message including the selected in-flight process identifier;
    selecting a new process identifier; and retransmitting the received data in a third transport block including the new process identifier.

24. The network node of claim 23, wherein selecting a new process identifier comprises selecting a next process identifier in sequence, such that a delay in retransmitting the received data, following receipt of the NACK message, is minimized.

25. The network node of claim 23, wherein retransmitting the received data comprises moving the received data from the temporary buffer to the process buffer associated with the selected new process identifier.

26. The network node of claim 23, wherein retransmitting the received data in a third transport block comprises setting a redundancy version, rv, of the third transport block to indicate that the received data in the third transport block is associated with a different process identifier than the received data in the second transport block.

* * * * *